US008689055B2

(12) United States Patent
Church et al.

(10) Patent No.: US 8,689,055 B2
(45) Date of Patent: Apr. 1, 2014

(54) DETECTING DEVICE IMPAIRMENT THROUGH STATISTICAL MONITORING

(75) Inventors: Caroline Church, Andover (GB); Mark Peter Frost, Eastleigh (GB); Dominic John Storey, Eastleigh (GB); John Frederick Wesley, Southampton (GB); Lakshman Sarathchandra Bandara Yatawara, Purley (GB)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/192,875

(22) Filed: Jul. 28, 2011

(65) Prior Publication Data

US 2013/0031422 A1    Jan. 31, 2013

(51) Int. Cl.
*G06F 11/00* (2006.01)
(52) U.S. Cl.
USPC ........................................ 714/47.3
(58) Field of Classification Search
USPC ........ 714/25–27, 32, 33, 37, 38.1, 39, 41, 45, 714/46, 47.1, 47.2, 47.3, 48, 51, 57
See application file for complete search history.

(56) References Cited

U.S. PATENT DOCUMENTS

| 5,887,216 A | 3/1999 | Motoyama |
| 6,327,677 B1 * | 12/2001 | Garg et al. ....................... 714/37 |
| 6,813,450 B2 | 11/2004 | Barrett |
| 6,816,898 B1 * | 11/2004 | Scarpelli et al. ............... 709/224 |
| 7,401,264 B1 | 7/2008 | Gill et al. |
| 7,641,107 B1 | 1/2010 | Gill et al. |
| 8,356,207 B2 * | 1/2013 | Hosek et al. ..................... 714/26 |
| 2005/0091227 A1 * | 4/2005 | McCollum et al. ............ 707/100 |
| 2008/0004764 A1 * | 1/2008 | Chinnadurai et al. .......... 701/29 |
| 2008/0294578 A1 | 11/2008 | de Kleer |
| 2009/0193111 A1 | 7/2009 | Sengupta et al. |
| 2010/0162030 A1 | 6/2010 | Schindel, Jr. et al. |
| 2011/0173496 A1 * | 7/2011 | Hosek et al. ..................... 714/26 |

OTHER PUBLICATIONS

Kiciman, Emre. "Using Statistical Monitoring to Detect Failures in Internet Services." A Dissertation submitted to the Department of Computer Science and the Committee on Graduate Studies of Stanford University in Partial Fulfilment of the Requirements for the Degree of Doctor of Philosophy. Sep. 2005.
Diebold Incorporated. "Opteview Remote Services." 2009. Uniontown, Ohio, USA. <http://www.diebold.com/opteview/OpteView_Whitepaper.pdf>.
IBM. "IBM Tivoli Configuration Manager for Automated Teller Machines V2.1 Helps Manage ATMs." Jun. 24, 2003.
Rohr, Matthias. "Timing Behavior Anomaly Detection for Fault Localization." 2006. In: International Research Training Group Workshop, pp. 20-21, Gito-Verlag, 2. ISBN 3-936771-871.

* cited by examiner

*Primary Examiner* — Nadeem Iqbal
(74) *Attorney, Agent, or Firm* — Jason H. Sosa

(57) ABSTRACT

A tool for detecting potential impairment in an electronic device. The tool classifies the user input into various categories and determines some measurement, typically a rate of input per user or per time, for determining average use statistics of the electronic device. The tool then determines if a calculated measurement based on user inputs deviates from the average use statistics past some threshold level of deviation. In response to surpassing the threshold level of deviation, the tool identifies the electronic device as potentially impaired.

17 Claims, 3 Drawing Sheets

US 8,689,055 B2

DETECTING DEVICE IMPAIRMENT THROUGH STATISTICAL MONITORING

FIELD OF THE INVENTION

This disclosure relates generally to fault detection in electronic devices and more specifically to using statistical monitoring of user inputs to detect potential device impairments.

BACKGROUND OF THE INVENTION

Many electronic devices are very user intensive, requiring a great deal of input from users. High levels of user input, physically entered into such an electronic device, may cause the device to be prone to various hardware impairments. Additionally, many such devices are accessible to a multitude of users, increasing the stresses on the hardware and the opportunity for tampering. Furthermore, an electronic device operated outdoors may be subject to environmental impairments. Examples of such user intensive devices include ATM machines, vending machines and ticket sales machines, payment terminals (e.g., car parking, grocery store self-checkout), and PIN entry terminals for credit/debit card payments.

Over time, physical buttons may degrade or stick and, in response, fail to register presses correctly. Sensors underneath the buttons may fail to make contact with the button or may lose sensitivity. Numbers or lettering on physical buttons may also wear down making it difficult for a user to determine which button to press. Touch screens may also deteriorate and lose sensitivity over time, failing to correctly register screen selections and entries. Computer diagnostics are often not equipped to detect these hardware failures. This is especially true where the button, screen, or the device as a whole is still operational, though not at an optimal level. Additionally, outside impairments unrelated to physical deterioration may also go undetected for some time. Outside impairments may include obscured displays (e.g., sun glare, graffiti) and various other tampering and vandalism (e.g., removal of a button, gum in a button, etc.).

Additionally, detecting touch screen errors may become increasingly important with the growth of mobile touch screen devices such as tablet computers and smart phones.

SUMMARY

Aspects of the present invention disclose a method, computer system, and computer program product for detecting a potential impairment in an electronic device. A computer collects historical data indicating rates corresponding to input from one or more users entered into the electronic device. The computer determines a recent trend in the historical data indicating that the rates at which users enter data into the electronic device has changed by a predetermined amount, and in response, the computer determines and reports a problem with the electronic device.

DETAILED DESCRIPTION

Figure 1:
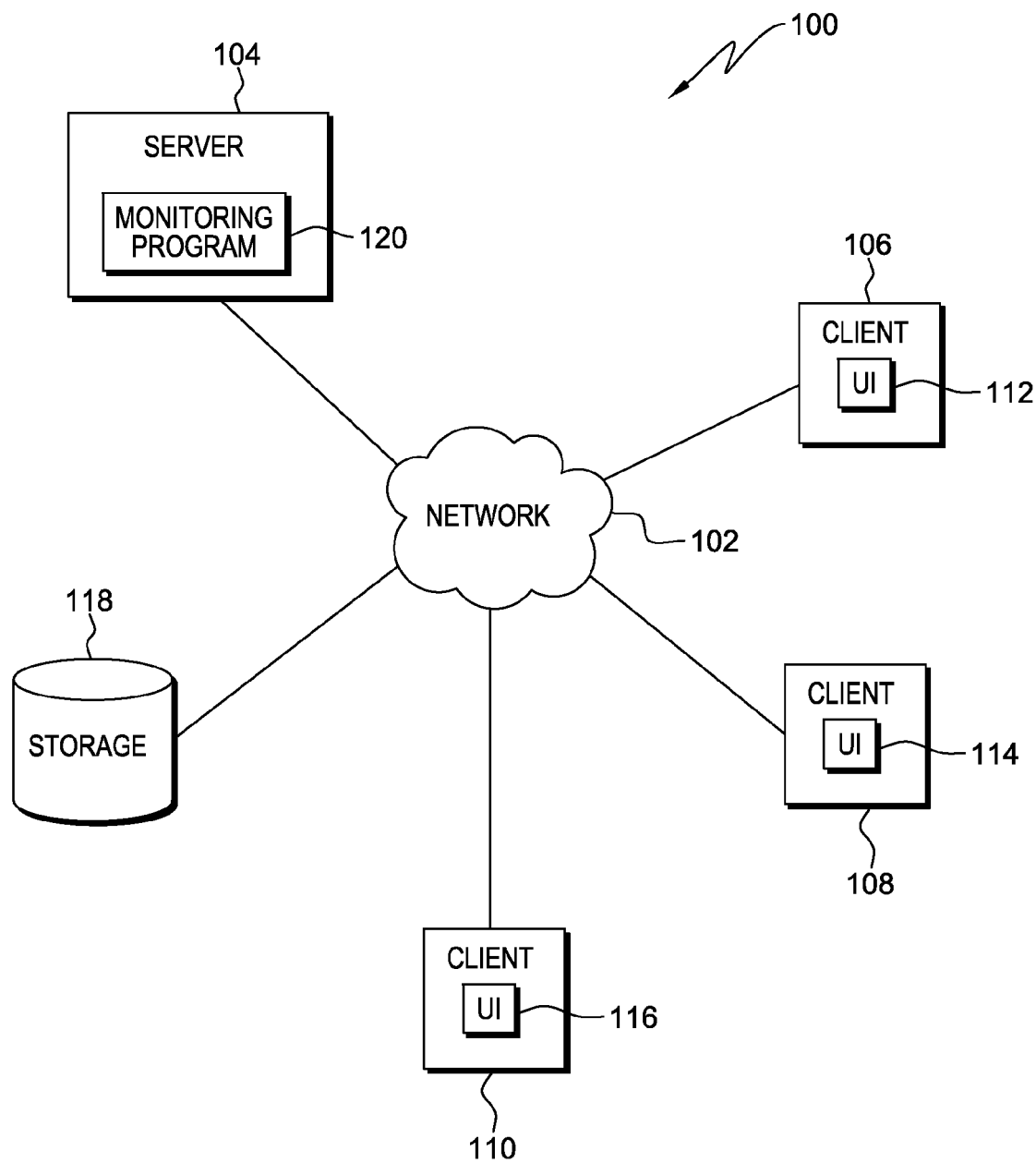
FIG. 1 depicts an illustrative diagram of a data processing environment as a network of data processing systems in which illustrative embodiments may be implemented.

FIG. 1 depicts an illustrative diagram of a data processing environment as a network of data processing systems in which illustrative embodiments may be implemented. It should be appreciated that FIG. 1 provides only an illustration of one implementation and does not imply any limitations with regard to the environments in which different embodiments may be implemented. Many modifications to the depicted environments may be made.

Network data processing system 100 comprises a network of computers in which an embodiment may be implemented. Network data processing system 100 contains network 102, which acts as a medium for providing communications links between various devices and computers connected together within network data processing system 100. Network 102 may include connections, such as wire, wireless communication links, or fiber optic cables.

In the depicted example, server computer system 104 connects to network 102. Server computer system 104 may be, for example, a management server, a web server, or any other electronic device or computing system capable of receiving and sending data. In one embodiment, server computer system 104 may also represent a computing system utilizing clustered computers and components to act as a single pool of seamless resources when accessed through network 102. This is a common implementation for data centers and cloud computing applications.

Client computer systems 106, 108, and 110 also connect to network 102. Client computer systems 106, 108, and 110 are examples of clients to server computer system 104, and may be electronic devices, such as an ATM machine, vending machine, ticket sales machine, payment terminal, or PIN entry terminal. Other examples of a potential client computer system include a notebook, a laptop computer, a tablet computer, a handheld device or smart-phone, a thin client, or any other electronic device or computing system capable of receiving user input and communicating with a server computer system through a network. Client computer systems 106, 108, and 110 may contain user interfaces (UI) 112, 114, and 116, respectively. UIs 112, 114, and 116 may display options and instructions for operation, and may accept data input and option selections corresponding to the design/purpose of the respective client computer system. UIs 112, 114, and 116 may be, for example, a graphical user interface (GUI) or a web user interface (WUI). Raw data and various calculations and derivations from the data may be sent to server computer system 104, via network 102, for additional processing.

Data gathered, generated, and maintained by various programs and operations may be stored on server computer system 104, any or all of client computer systems 106, 108, and 110, and/or network storage unit 118.

Network data processing system 100 may include additional server computers, client computers, displays and other devices not shown.

In one embodiment, monitoring program 120 runs on server computer system 104 to receive user input from an electronic device (such as client computer systems 106, 108, or 110) and/or data derived from the user input, and continually maintains a statistical profile that describes average operations and use scenarios of the electronic device. If input and/or data derived from the input deviates from the statistical profile past a given degree, monitoring program 120 flags the electronic device as potentially impaired.

In another embodiment, monitoring program 120 maintains a statistical profile for a type of electronic device (such as a specific model of an ATM machine) based on received user input and/or derived data from a number of such electronic devices. For example, if client computer systems 106, 108, and 110 were all the same model machine, monitoring program 120 on server computer system 104 might maintain a statistical profile for that specific model. In this embodiment, monitoring program 120 would flag a specific electronic device as potentially impaired if input/data from the specific device deviated from the statistical profile of operation created for a plurality of similar devices.

In yet another embodiment, monitoring program 120 resides and operates on one or more of client computer systems 106, 108, and 110. If monitoring program 120 flags its respective client computer system as potentially impaired, monitoring program 120 may send an indication of this possibility to server computer system 104.

Figure 3:
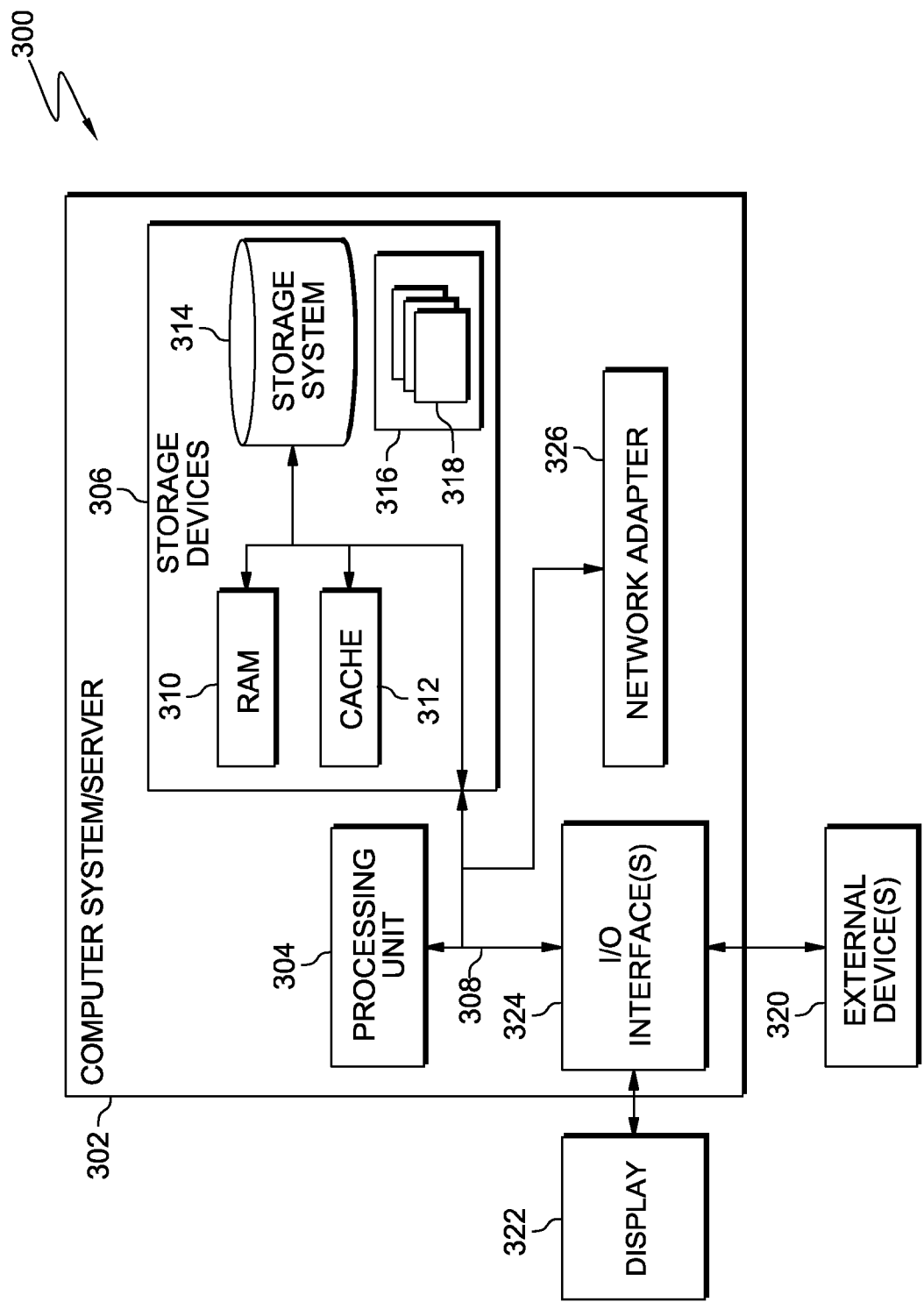
FIG. 3 depicts a block diagram of components of a data processing system depicted in accordance with an illustrative embodiment.

Server computer system 104 and client computer systems 106, 108, and 110, each maintain respective system components. Exemplary components of the server and clients are illustrated in FIG. 3.

In the depicted example, network data processing system 100 is the Internet with network 102 representing a worldwide collection of networks and gateways that use the Transmission Control Protocol/Internet Protocol suite of protocols to communicate with one another. Network data processing system 100 may also be implemented as a number of different types of networks, such as an intranet, a local area network (LAN), or a wide area network (WAN). FIG. 1 is intended as an example, and not as an architectural limitation for the different embodiments.

Figure 2:
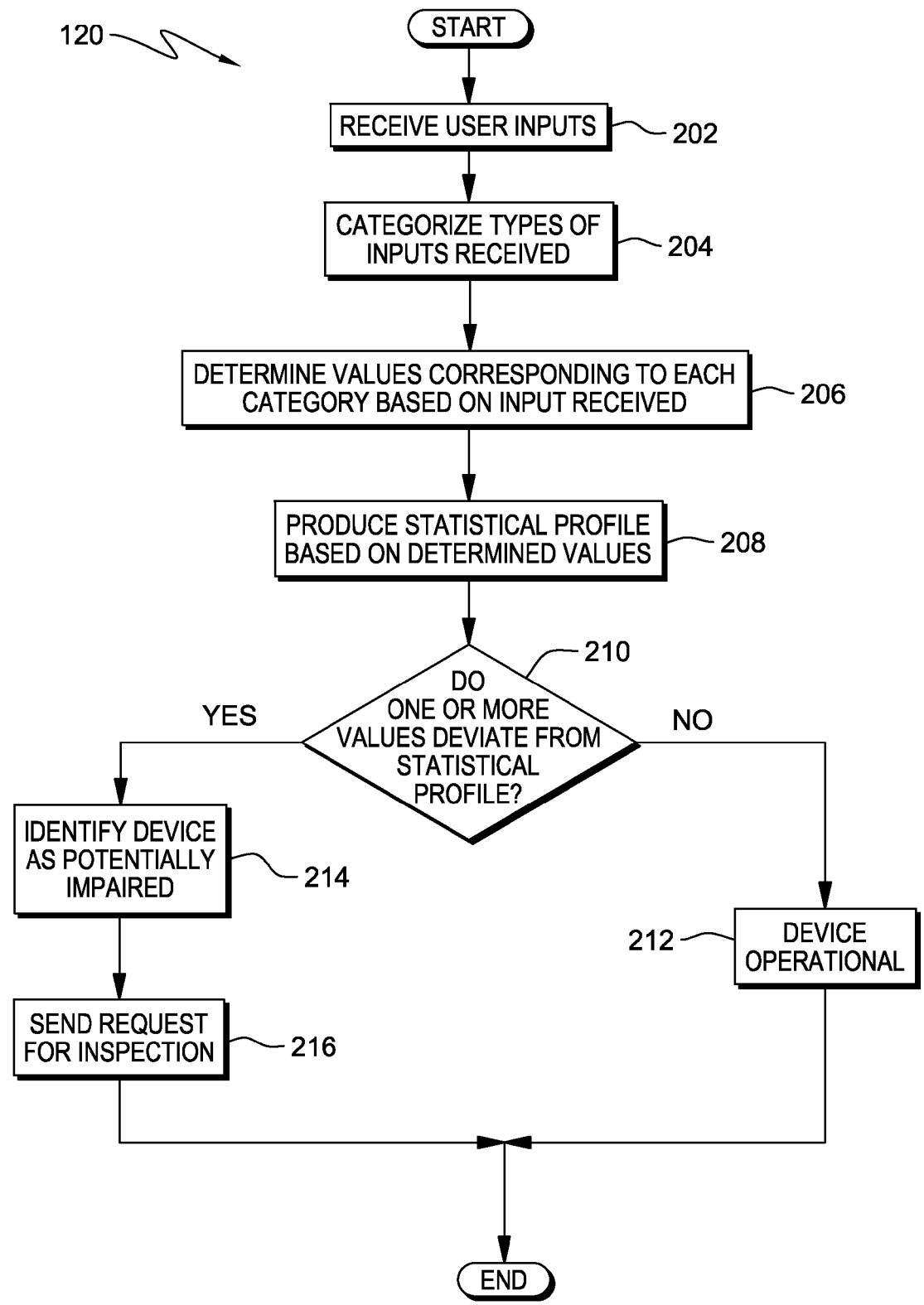
FIG. 2 illustrates the steps of a flowchart for a monitoring program to detect potential impairments of an electronic device in accordance with an embodiment of the present invention.

FIG. 2 illustrates a flow chart for the steps of monitoring program 120 in accordance with an embodiment of the invention.

Monitoring program 120 begins by receiving user inputs (step 202). User input is typically raw data entered into a computing device by way of a key pad or touch screen. A user input may be a specific character received or a grouping of characters, such as words or pin numbers. User input may also include user selections, sequences of selections, and the like. In another embodiment, user input may be received by monitoring program 120 as a summary of the raw data received.

Monitoring program 120 categorizes the user inputs (step 204). In the preferred embodiment certain buttons, tabs, and selection options are hardcoded to correspond to a given category. In another embodiment, monitoring program 120 may work with a combination of user inputs and determine what category they should belong to.

Each category represents a group of values from which statistical information may be derived. Exemplary categories include: data input (e.g., all entered information), corrective action (e.g., backspace key, delete key, a reset option, etc.), failed use (e.g., canceled transaction), and option selection (e.g., the input is the selection of an available option or function). Each input may belong in more than one category. For example, an input of selecting a cancellation option may be classified a corrective action, as a failed usage input, and/or a selection of an available option.

Based on the user input, monitoring program 120 determines values for the corresponding categories (step 206). The values represent a rate or standard measure for that category of user input. In one embodiment, a rate may be calculated as a number of inputs of a specific category per user. For example, the number of corrective actions taken per user. In another embodiment, a rate may be input in relation to time, such as the number of failed uses per hour (or per day, per week, etc.). In a third embodiment, a rate may be input in relation to time, per user. For example, if data input rates were determined (characters per minute for a PIN number, words per minute for text entry, time taken to select an option from a list, etc.), these input to time rates might only make sense in the context of a single user.

Monitoring program 120 produces a statistical profile based on the determined values (step 208). The statistical profile may include a rate average or mean for each category. In another embodiment the statistical profile may include a range of values based on the rate average. As the user(s) continue to use the device, new rates for the categories continue to be calculated. Monitoring program 120 continues to take the newly calculated rate into account when determining the rate averages and the statistical profile of the device.

In another embodiment, rates are calculated for multiple devices of the same type (i.e., all the same model ATM machine). In such an embodiment, the averages and profile may reflect a profile for the specific type of device and not the individual device. In another embodiment, separate profiles are kept for both the individual device and the type of device.

Monitoring program 120 determines if any of the rates received deviate past a certain degree from the statistical profile (decision block 210). If the rates do deviate from the statistical profile, the device is identified as potentially impaired (step 214). If the rates do not deviate from the statistical profile, the device is identified as operational (step 212).

Where the statistical profile is defined by one or more ranges of average values/rates, even a slight deviation may cause the device to be marked as impaired. If, on the other hand, the statistical profile comprises an average value for each category, a threshold of deviation may have to be reached first. Such a threshold may be a percentage of change from the statistical average, a number of standard deviations away from the statistical average, a confidence interval indicative of reliability, etc. The threshold may also vary depending on the category. For example, one category may be considered less important than another or have a high variability rate. Such a category may be given a higher tolerance for deviation than a category where any errors are expensive in terms of efficiency.

If the device is identified as potentially impaired, in the preferred embodiment, a request is issued for the device to be inspected (step 216). In an embodiment where the device performs a self-analysis, the request may be issued to a central server system.

FIG. 3 depicts a block diagram of components of a data processing system in accordance with an illustrative embodiment. Data processing system 300 is an exemplary system of components, depicted as computer system 302, corresponding to server computer system 104 and client computer systems 106, 108, and 110.

Computer system 302 is only one example of a suitable computer system and is not intended to suggest any limitation as to the scope of use or functionality of embodiments of the invention described herein. Regardless, computer system 302 is capable of being implemented and/or performing any of the functionality set forth hereinabove.

Examples of well-known computing systems, environments, and/or configurations that may be suitable for use with computer system 302 include, but are not limited to, personal computer systems, server computer systems, thin clients, thick clients, hand-held or laptop devices, multiprocessor systems, microprocessor-based systems, user intensive electronic devices, set top boxes, programmable consumer electronics, network PCs, minicomputer systems, mainframe computer systems, and distributed cloud computing environments that may include any of the above systems or devices.

Computer system 302 may be described in the general context of computer system-executable instructions, such as program modules, being executed by a computer system. Generally, program modules may include routines, programs, objects, components, logic, data structures, and so on that perform particular tasks or implement particular abstract data types. Computer system 302 may be practiced in distributed cloud computing environments where tasks are performed by remote processing devices that are linked through a communications network. In a distributed cloud computing environment, program modules may be located in both local and remote computer system storage devices. Additionally, program modules on local storage devices of computer system 302 may be distributed through a network to a separate computer system for use in computer-readable storage devices of the separate computer system.

Computer system 302 is shown in the form of a general purpose computing device. The components of computer system 302 may include, but are not limited to, one or more processors or processing units 304, computer-readable storage devices 306, and a bus 308 that couples various system components including storage devices 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Storage devices 306 may be any available storage device that is accessible to computer system 302, and includes both volatile and non-volatile memory, and removable and non-removable storage devices.

For example, storage devices 306 can include random access memory (RAM) 310 and/or cache memory 312. Storage devices 306 may further include other removable/non-removable, volatile/non-volatile computer-readable devices. Storage system 314 can be provided for reading from and writing to a non-removable, magnetic disk storage device of an internal hard drive. Alternatively, storage system 314 may be a semiconductor storage device, such as ROM, EPROM, flash memory or any other computer-readable tangible storage device capable of storing a computer program and digital information. Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical device can be provided. In such instances, each can be connected to bus 308 by one or more data storage interfaces. As will be further described below, storage devices 306 may include at least one program product having a set (e.g., at least one) of program modules that are configured to carry out the functions of embodiments of the present invention.

Program code embodied on a computer-readable storage device may be transmitted using any appropriate medium including, but not limited to, wireless, wireline, optical fiber cable, radio-frequency (RF), etc., or any suitable combination of the foregoing.

Program 316, having a set (at least one) of program modules 318, may be stored on storage system 314, along with an operating system, one or more application programs, other program modules, and program data. Program 316 may be any set of instructions operating on a computer system, such as monitoring program 120. Each of the operating systems, one or more application programs, other program modules, and program data or some combination thereof, may include an implementation of a networking environment. Program modules 318 may carry out the functions and/or methodologies of embodiments of the present invention as described herein.

Computer system 302 may also communicate with one or more external devices 320 (such as display 322), one or more devices that enable a user/consumer to interact with computer system 302 (key pad, touch screen, etc.), and/or any devices (e.g., network card, modem, etc.) that enable computer system 302 to communicate with one or more other computing devices. Such communication can occur via I/O interfaces 324. Computer system 302 can also communicate with one or more networks, such as a local area network (LAN), a general wide area network (WAN), and/or a public network (e.g., the Internet) via network adapter 326. As depicted, network adapter 326 communicates with the other components of computer system 302 via bus 308. It should be understood that although not shown, other hardware and/or computer software components could be used in conjunction with computer system 302. Examples include, but are not limited to: microcode, device drivers, redundant processing units, external disk drive arrays, RAID systems, tape drives, and data archival storage systems, etc.

Monitoring program 120 can be written in various programming languages (such as Java, C++) including low-level, high-level, object-oriented or non object-oriented languages. Alternatively, the functions of monitoring program 120 can be implemented in whole or in part by computer circuits and other hardware (not shown).

Based on the foregoing, a computer system, method, and program product have been disclosed for detecting potential impairment of an electronic device. However, numerous modifications and substitutions can be made without deviating from the scope of the present invention. In this regard, each block in the flowchart may represent a module, segment, or portion of code, which comprises one or more executable instructions for implementing the specified logical functions (s). It should also be noted that, in some alternative implementations, the functions noted in the blocks may occur out of the order noted in the figures. Therefore, the present invention has been disclosed by way of example and not limitation.

What is claimed is:

1. A method for detecting a potential problem with an electronic device, the method comprising the steps of:
   a computer collecting historical data indicating rates corresponding to input entered into the electronic device by one or more users;
   the computer collecting historical data indicating rates corresponding to input from one or more users entered into one or more similar electronic devices;
   the computer combining the historical data of the one or more similar electronic devices with the historical data of the electronic device;
   the computer determining a recent trend in the historical data, collected from the electronic device, deviates by a predetermined amount from the combined historical data, and in response, the computer determining that there is a potential problem with the electronic device; and
   the computer reporting the potential problem.

2. The method of claim 1, wherein the rates corresponding to the input entered by one or more users are selected from the group consisting of: a rate at which users select an input option, a rate at which users correct data entered, a rate at which users enter data, and a rate at which users cancel transactions.

3. The method of claim 1, wherein the predetermined amount is selected from the group comprising: a percentage of change from a statistical average, a number of standard deviations away from the statistical average, and a deviation outside of a determined confidence interval indicative of reliability.

4. The method of claim 1, further comprising the steps of:
the electronic device receiving input from a user;
the electronic device determining one or more rates corresponding to the input; and
the electronic device sending the one or more rates to the computer.

5. The method of claim 1, further comprising the steps of:
the electronic device receiving input from a user;
the electronic device sending the input to the computer; and
the computer determining one or more rates corresponding to the input.

6. The method of claim 1, wherein the step of the computer reporting the problem with the electronic device comprises the computer sending an indication of the problem to a server computer.

7. A computer system for detecting a potential problem with an electronic device, the computer system comprising:
one or more processors, one or more computer-readable memories, one or more computer-readable tangible storage devices and program instructions which are stored on the one or more storage devices for execution by the one or more processors via the one or more memories, the program instructions comprising:
program instructions to collect historical data indicating rates corresponding to input entered into the electronic device by one or more users;
program instructions to collect historical data indicating rates corresponding to input from one or more users entered into one or more similar electronic devices;
program instructions to combine the historical data of the one or more similar electronic devices with the historical data of the electronic device;
program instructions to determine a recent trend in the historical data, collected from the electronic device, deviates by a predetermined amount from the combined historical data, and in response, determine that there is a potential problem with the electronic device; and
program instructions to report the potential problem.

8. The computer system of claim 7, wherein the rates corresponding to the input from the one or more users are selected from the group consisting of: a rate at which users select an input option, a rate at which users correct data entered, a rate at which users enter data, and a rate at which users cancel transactions.

9. The computer system of claim 7, wherein the predetermined amount is selected from the group comprising: a percentage of change from a statistical average, a number of standard deviations away from the statistical average, and a deviation outside of a determined confidence interval indicative of reliability.

10. The computer system of claim 7, further comprising program instructions, stored on at least one of the one or more storage devices for execution by at least one of the one or more processors via at least one of the one or more memories, to:
receive input from a user; and
determine one or more rates corresponding to the input.

11. The computer system of claim 10, further comprising program instructions, stored on at least one of the one or more storage devices for execution by at least one of the one or more processors via at least one of the one or more memories, to receive one or more rates corresponding to input from a user entered into the electronic device from the electronic device.

12. The computer system of claim 7, wherein the program instructions to report the problem with the electronic device comprise program instructions to send an indication of the problem to a server computer.

13. A computer program product for detecting a potential problem with an electronic device, the computer program product comprising:
one or more computer-readable tangible storage devices and program instructions stored on at least one of the one or more storage devices, the program instructions comprising:
program instructions to collect historical data indicating rates corresponding to input entered into the electronic device by one or more users;
program instructions to collect historical data indicating rates corresponding to input from one or more users entered into one or more similar electronic devices;
program instructions to combine the historical data of the one or more similar electronic devices with the historical data of the electronic device;
program instructions to determine a recent trend in the historical data, collected from the electronic device, deviates by a predetermined amount from the combined historical data, and in response, determine that there is a potential problem with the electronic device; and
program instructions to report the potential problem.

14. The computer program product of claim 13, wherein the rates corresponding to the input from the one or more users are selected from the group consisting of: a rate at which users select an input option, a rate at which users correct data entered, a rate at which users enter data, and a rate at which users cancel transactions.

15. The computer program product of claim 13, wherein the predetermined amount is selected from the group comprising: a percentage of change from a statistical average, a number of standard deviations away from the statistical average, and a deviation outside of a determined confidence interval indicative of reliability.

16. The computer program product of claim 13, further comprising program instructions, stored on at least one of the one or more storage devices, to:
receive input from a user; and
determine one or more rates corresponding to the input.

17. The computer program product of claim 13, wherein the program instructions to report the problem with the electronic device comprise program instructions to send an indication of the problem to a server computer.

* * * * *